United States Patent
Greco

(10) Patent No.: US 7,278,258 B2
(45) Date of Patent: Oct. 9, 2007

(54) FLOATING FLEXIBLE FIREWALL SEAL

(75) Inventor: Robert J. Greco, Mesa, AZ (US)

(73) Assignee: Honeywell International, Inc., Morristown, NJ (US)

( * ) Notice: Subject to any disclaimer, the term of this patent is extended or adjusted under 35 U.S.C. 154(b) by 432 days.

(21) Appl. No.: 10/987,491

(22) Filed: Nov. 12, 2004

(65) Prior Publication Data

US 2006/0101805 A1    May 18, 2006

(51) Int. Cl.
*F02K 1/54* (2006.01)
(52) U.S. Cl. .................... 60/226.2; 277/606
(58) Field of Classification Search ............ 60/226.2, 60/230; 277/606, 616, 626, 634, 637, 640, 277/644
See application file for complete search history.

(56) References Cited

U.S. PATENT DOCUMENTS

| | | | |
|---|---|---|---|
| 4,132,399 A | 1/1979 | Lechanu et al. | |
| 4,199,151 A | 4/1980 | Bartos | |
| 4,213,619 A * | 7/1980 | Arlt et al. | 277/616 |
| 4,291,905 A | 9/1981 | Schrock | |
| 4,706,969 A | 11/1987 | Mouri et al. | |
| 4,986,553 A | 1/1991 | Preston et al. | |
| 5,011,163 A | 4/1991 | Hermann et al. | |
| 5,114,162 A * | 5/1992 | Ditcher | 277/605 |
| 5,251,917 A | 10/1993 | Chee et al. | |
| 5,713,579 A | 2/1998 | Petrak et al. | |
| 5,722,699 A | 3/1998 | Brancher | |
| 5,778,659 A * | 7/1998 | Duesler et al. | 60/226.1 |
| 5,899,059 A * | 5/1999 | Gonidec et al. | 60/230 |
| 5,961,155 A | 10/1999 | Youngs | |
| 5,967,567 A | 10/1999 | Nordstrom | |
| 6,086,117 A * | 7/2000 | Youngs | 285/205 |
| 6,487,845 B1 * | 12/2002 | Modglin et al. | 60/226.2 |
| 6,739,596 B2 * | 5/2004 | Matczak et al. | 277/606 |
| 2002/0184874 A1* | 12/2002 | Modglin et al. | 60/226.1 |
| 2003/0042358 A1 | 3/2003 | Sternberger | |
| 2003/0066284 A1 | 4/2003 | Chakkera et al. | |
| 2006/0042229 A1* | 3/2006 | Hanlon et al. | 60/226.2 |

* cited by examiner

*Primary Examiner*—William H. Rodriguez
(74) *Attorney, Agent, or Firm*—Ingrassia Fisher & Lorenz

(57) ABSTRACT

A seal assembly is provided for sealing an interface between a shaft and a bore formed in a firewall, where the shaft has an annular foot extending radially outward therefrom and a flowpath extending therethrough in fluid communication with the bore. The assembly includes a flexible annular seal, a ring, and a plurality of retainers.

38 Claims, 5 Drawing Sheets

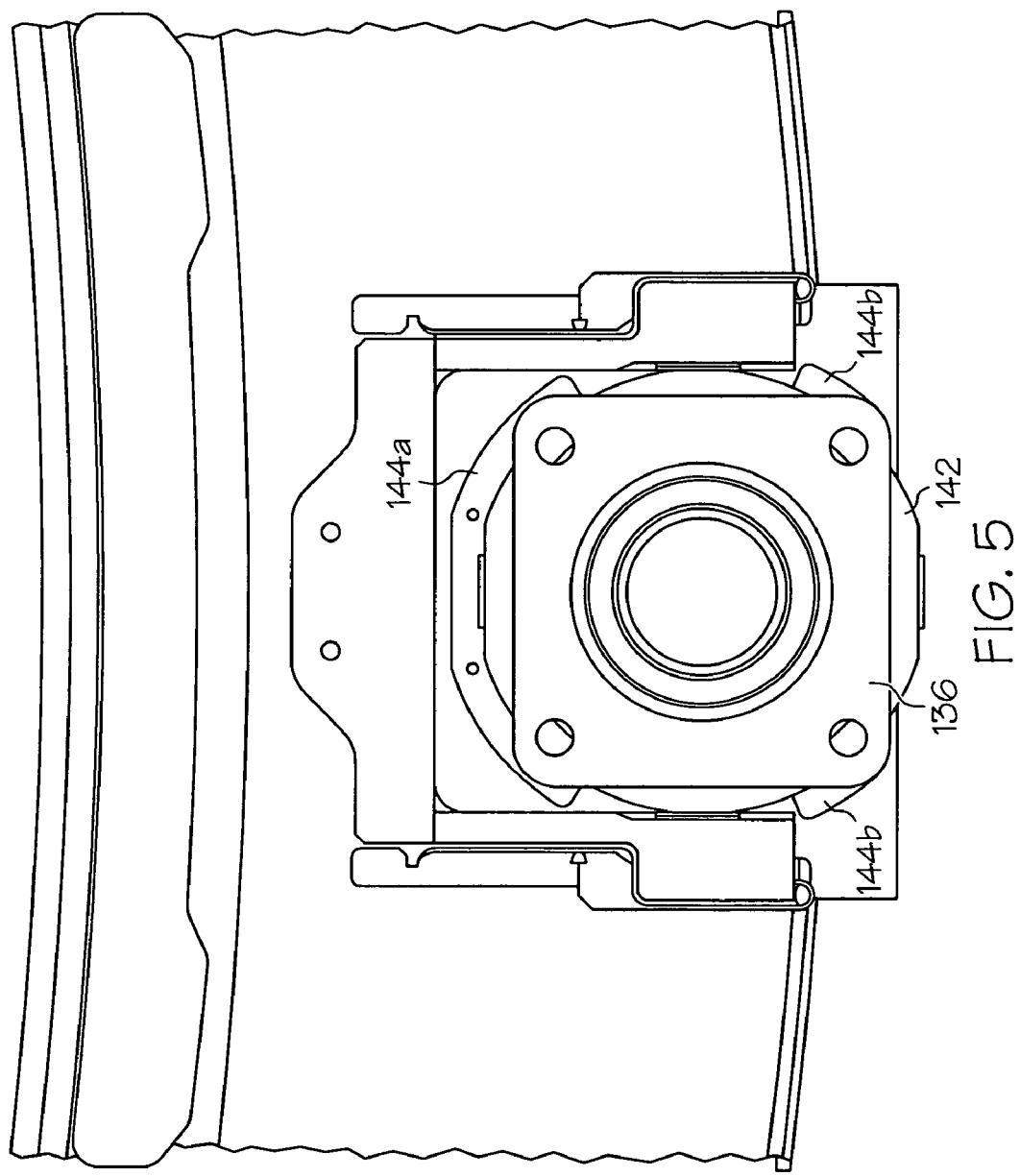

FLOATING FLEXIBLE FIREWALL SEAL

TECHNICAL FIELD

The present invention relates to an aircraft firewall and, more particularly, to an assembly for sealing the aircraft firewall.

BACKGROUND

When jet-powered aircraft land, the landing gear brakes and imposed aerodynamic drag loads (e.g., flaps, spoilers, etc.) of the aircraft may not be sufficient to slow the aircraft down in the required amount of runway distance. Thus, jet engines on most aircraft include thrust reversers to enhance the stopping power of the aircraft. When deployed, thrust reversers redirect the rearward thrust of the jet engine to a forward direction to decelerate the aircraft. Because the jet thrust is directed forward, the jet thrust also slows down the aircraft upon landing.

Various thrust reverser designs are commonly known, and the particular design utilized depends, at least in part, on the engine manufacturer, the engine configuration, and the propulsion technology being used. Thrust reverser designs used most prominently with turbofan jet engines fall into three general categories: (1) cascade-type thrust reversers; (2) target-type thrust reversers; and (3) pivot door thrust reversers. Each of these designs employs a different type of moveable thrust reverser component to change the direction of the jet thrust; however, each is designed to enhance the stopping power of the aircraft, thereby shortening the stopping distance during landing. Hence, thrust reversers are primarily deployed during the landing process to slow the aircraft. Thereafter, when the thrust reversers are no longer needed, they are returned to their original, or stowed, position and are locked.

The thrust reverser components may be moved using hydraulic, pneumatic, or electric (electromechanical) actuation systems. Actuation systems typically include at least a controller and actuators each connected to a moveable shaft. During thrust reverser operation, some of these components may be prone to exposure to extreme pressures and temperatures. To isolate these components from the extreme environments, a firewall is typically used. In some configurations, the shaft passes through an opening in the firewall and a fireproof seal is mounted to the firewall to ensure that unwanted extreme temperatures do not pass through the opening.

Although conventional fireproof seal assemblies are generally effective, they may suffer from certain drawbacks. For example, in some configurations, the seal assembly may not allow the actuator to move in a sufficient number of degrees of freedom. Thus, the actuator may not function as desired. In other configurations, it may be relatively difficult to mount the seal assembly to the actuator. In particular, some of these components, such as the shaft, may be relatively heavy to lift or unwieldy to handle. Additionally, mounting the seal to the shaft may require a large amount of force, which may necessitate the involvement of more than one assembler. Consequently, maintenance or assembly of the actuator may not be as time and/or cost efficient as desired.

Accordingly, it is desirable to have a fireproof seal assembly that provides sufficient freedom of movement to the actuator. In addition, it is desirable to have a fireproof seal assembly that is relatively simple and time-and cost efficient to install. Furthermore, other desirable features and characteristics of the present invention will become apparent from the subsequent detailed description of the invention and the appended claims, taken in conjunction with the accompanying drawings and this background of the invention.

BRIEF SUMMARY

The present invention provides a seal assembly for sealing an interface between a shaft and a bore formed in a firewall, where the shaft has an annular foot extending radially outward therefrom and a flowpath extending therethrough in fluid communication with the bore. The assembly includes a flexible annular seal, a ring, and a plurality of retainers. The flexible annular seal is configured to be disposed concentric to the annular foot. The seal has an inner wall coupled to an outer wall to define a space therebetween. The inner wall has a first and a second flange extending radially inward therefrom. The first and second flanges are spaced apart for receiving the annular foot therebetween. The ring is disposed concentric to the annular seal and has a sidewall and an annular engagement flange. The sidewall contacts the annular seal, supplying a force against the seal to provide a leak tight fit between the annular seal and the ring. The annular engagement flange extends radially outward from the sidewall. Each retainer of the plurality of retainers is disposed at predetermined locations around the ring, and each has a firewall contact section coupled to a ring contact section. The firewall contact section is adapted to couple to the firewall and the ring contact section is coupled to the annular engagement flange.

In another embodiment, an aircraft firewall is provided that includes a housing, a shaft, a flexible annular seal, a ring, and a plurality of retainers. The housing has a wall defining a cavity and a bore formed in the cavity. The shaft has an annular foot extending radially outward therefrom and a flowpath extending therethrough in fluid communication with the bore. The flexible annular seal is disposed concentric to the annular foot and has an inner wall coupled to an outer wall to define a space therebetween. The inner wall has a first and a second flange extending radially inward therefrom. The first and second flanges are spaced apart and receive the annular foot therebetween. The ring is disposed concentric to the annular seal and has a sidewall and an annular engagement flange. The sidewall contacts the annular seal, supplying a force against the seal to provide a leak tight fit between the seal and ring. The annular engagement flange extends radially outward from the sidewall. Each retainer of the plurality of retainers is disposed at predetermined locations around the ring and each retainer has a firewall contact section coupled to a ring contact section. The firewall contact section is coupled to the housing wall and the ring contact section is coupled to the annular engagement flange.

In another embodiment, a thrust reverser system is provided that comprises a housing, an actuator head support, and a seal assembly. The housing has a bore formed therein. The actuator head support is coupled to the housing. The actuator head support has an annular foot extending radially outward therefrom and a flowpath extending therethrough in fluid communication with the bore. The seal assembly is coupled to the actuator head support and the housing and comprises a flexible annular seal, a ring, and a plurality of retainers. The flexible annular seal is disposed concentric to the annular foot and has an inner wall coupled to an outer wall to define a space therebetween. The inner wall has a first and a second flange extending radially inward therefrom. The first and second flanges are spaced apart and receive the annular foot therebetween. The ring is disposed concentric to the annular seal and has a sidewall and an annular engagement flange. The sidewall contacts the annular seal supplying a force against the seal to provide a leak tight fit between the seal and ring. The annular engagement flange extends radially outward from the sidewall. Each retainer of the plurality of retainers is disposed at predetermined locations around the ring, and each retainer has a firewall contact section coupled to a ring contact section. The firewall contact section is coupled to the housing wall and the ring contact section is coupled to the annular engagement flange.

Other independent features and advantages of the preferred seal assembly will become apparent from the following detailed description, taken in conjunction with the accompanying drawings which illustrate, by way of example, the principles of the invention.

BRIEF DESCRIPTION OF THE DRAWINGS

FIG. 5 is a plan view of the fire seal assembly depicted in FIG. 4.

DETAILED DESCRIPTION OF A PREFERRED EMBODIMENT

The following detailed description of the invention is merely exemplary in nature and is not intended to limit the invention or the application and uses of the invention. Furthermore, there is no intention to be bound by any theory presented in the preceding background of the invention or the following detailed description of the invention. Although this invention is described herein as being implemented into a firewall, it will be appreciated that the seal assembly may be used to seal any bore/shaft interface found in any application.

Figure 1:
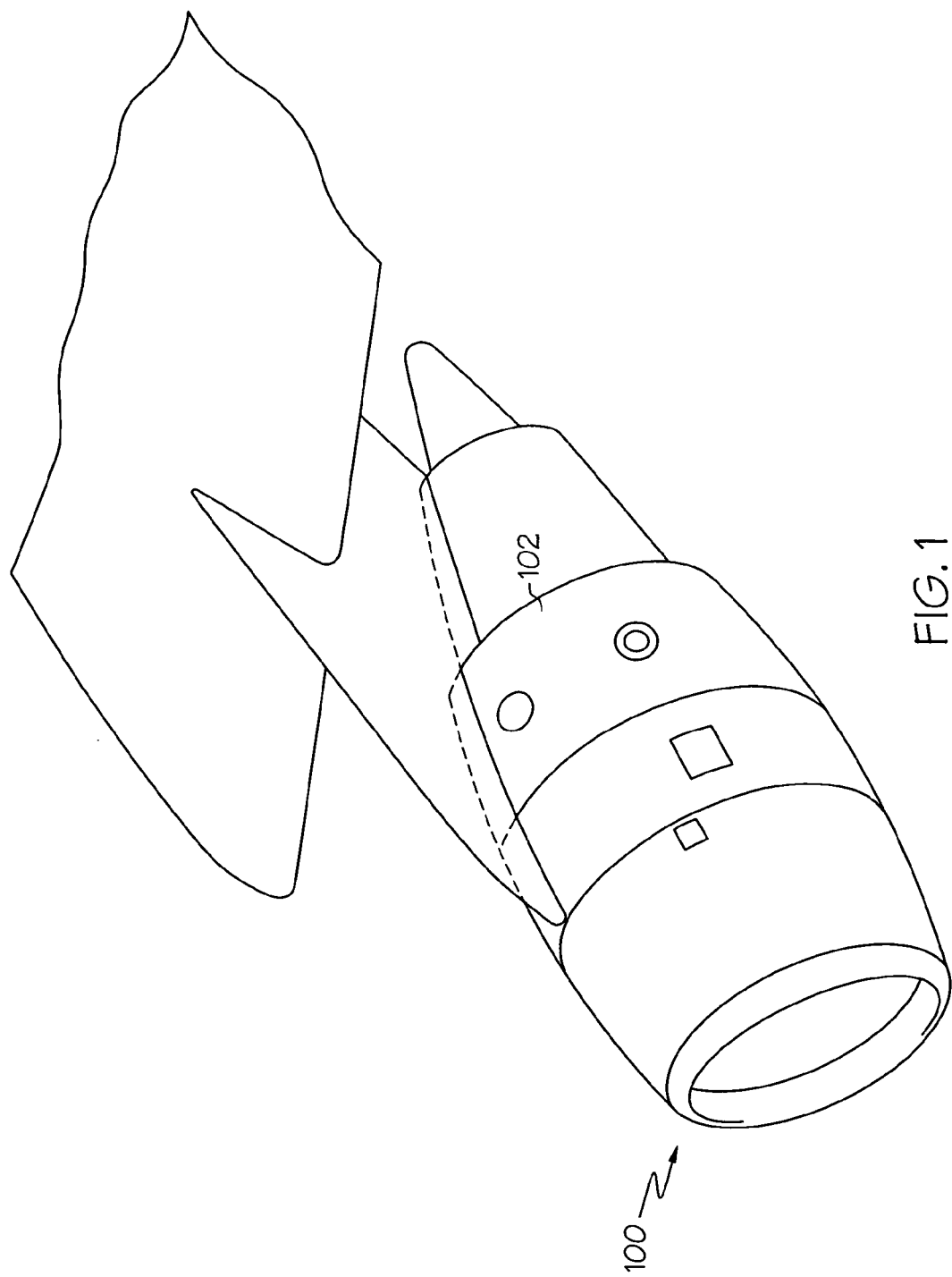
FIG. 1 is a perspective view of an aircraft engine.

Turning now to the description, and with reference first to FIG. 1, a perspective view of portions of an aircraft jet engine fan case 100 that incorporates a cascade-type thrust reverser is depicted. The engine fan case 100 includes a pair of semi-circular transcowls 102 that are positioned circumferentially on the outside of the fan case 100.

Figure 2:
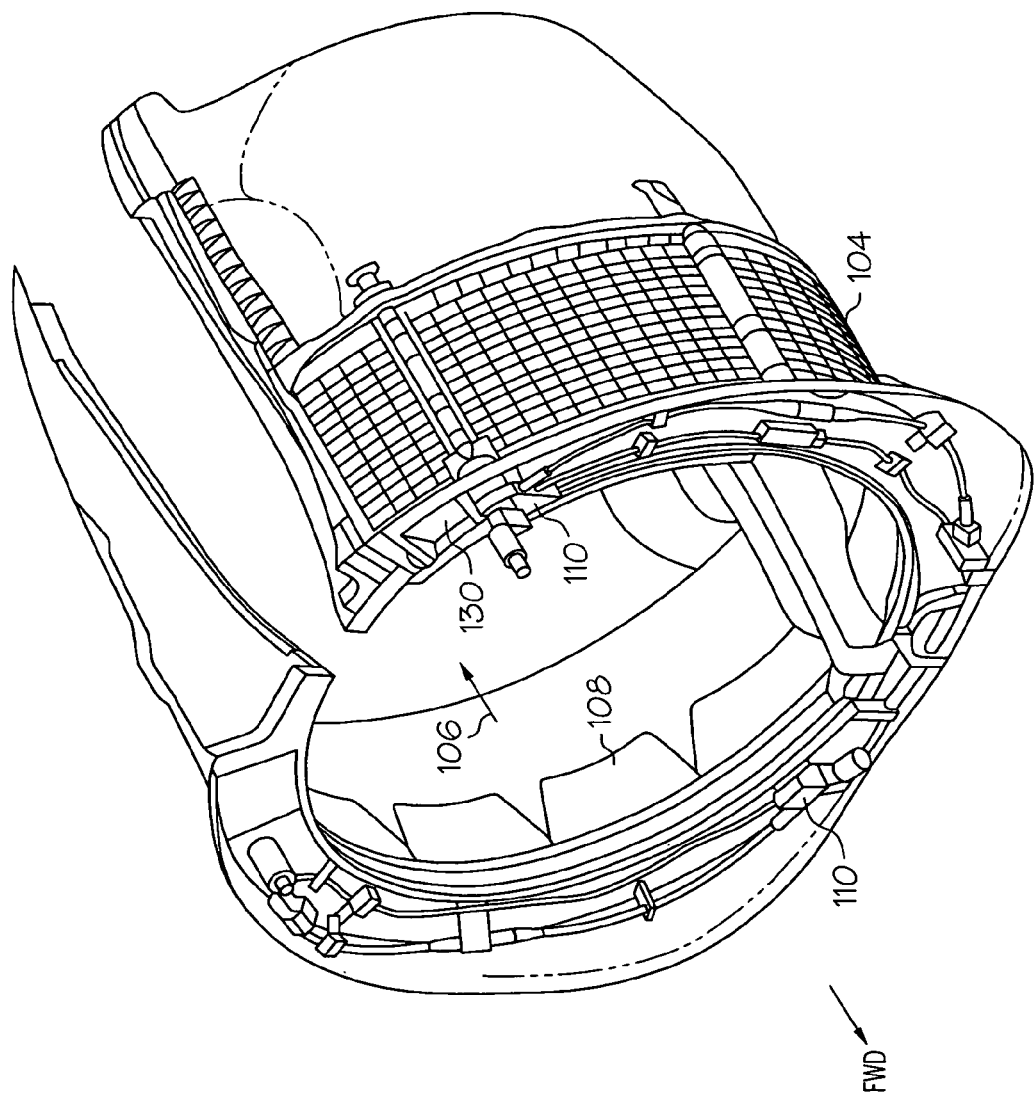
FIG. 2 is a perspective view of portions of an engine fan cowl and thrust reverser system utilized with the engine of FIG. 1.

With reference to FIGS. 1 and 2, the transcowls 102 cover a plurality of cascade vanes 104, which are positioned between the transcowls 102 and a bypass air flow path 106. When in the stowed position, the transcowls 102 are pressed against one or more stow seals. The stow seals prevent air from flowing through the transcowls 102 when the thrust reversers are in the stowed position. A series of blocker doors 108 are mechanically linked to the transcowls 102 via a drag link that is rotatably connected to an inner wall that surrounds the engine case. In the stowed position, the blocker doors 108 form a portion of the inner wall and are therefore oriented parallel to the bypass air flow path 106. When the thrust reversers are deployed, the transcowls 102 are translated aft, causing the blocker doors 108 to rotate into a deployed position, such that the bypass air flow path 106 is blocked. This also causes the cascade vanes 104 to be exposed and the bypass air flow to be redirected out the cascade vanes 104. The re-direction of the bypass air flow in a forward direction creates a reverse thrust and, thus, works to slow the airplane. One or more actuators 110 per engine are used to operate the transcowls 102.

Figure 3:
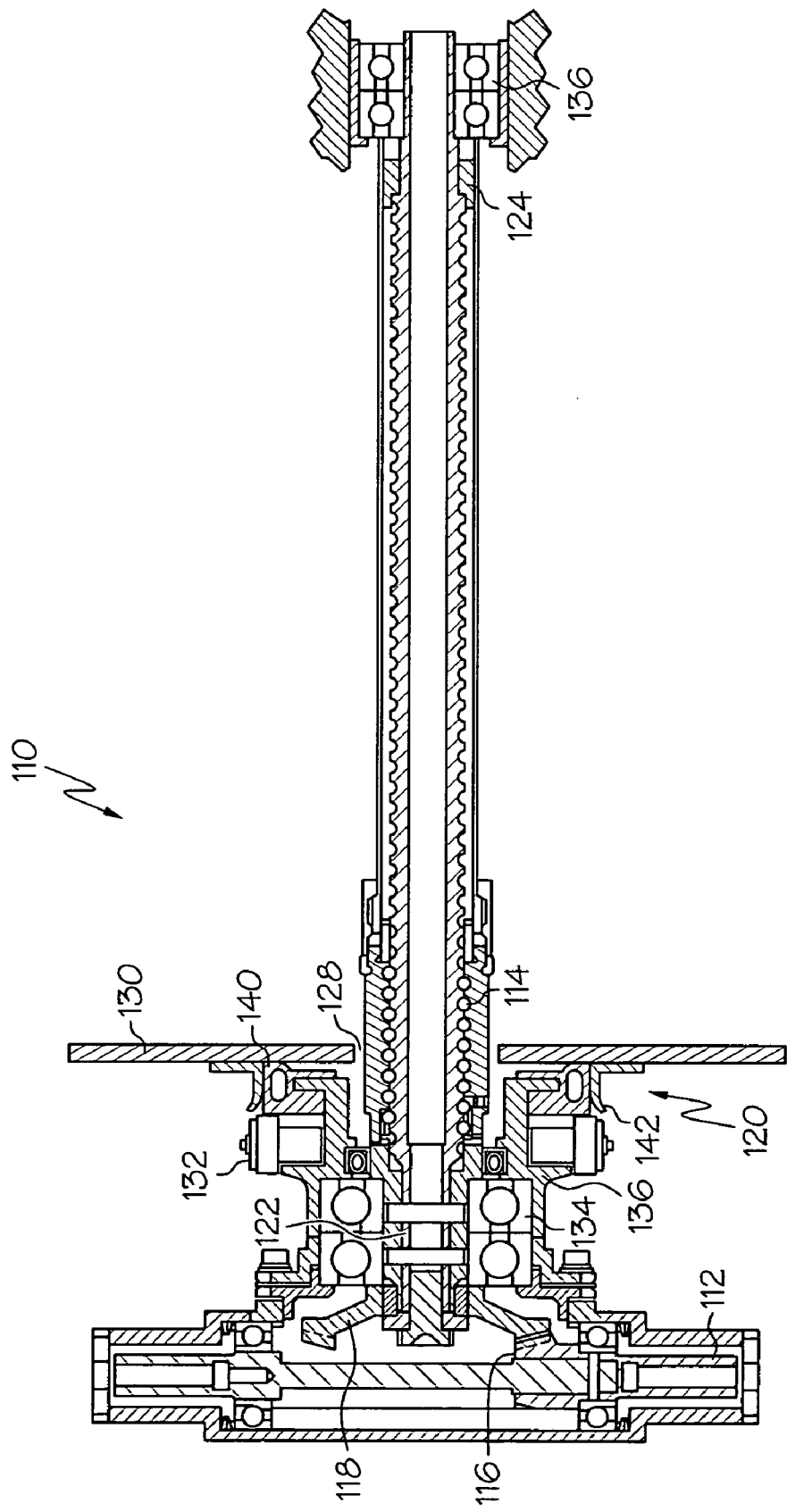
FIG. 3 is a cross section view of an actuator element that may be utilized in the thrust reverser system depicted in FIG. 2.

Turning now to FIG. 3, a close-up view of one of the actuators 110 is provided. The actuator 110 includes an input shaft 112, a ball screw shaft 114, and a seal assembly 120. The input shaft 112 is configured to couple to a non-illustrated flexshaft and to cause the ball screw shaft 114 to rotate. In this regard, the input shaft 112 is coupled to a gearing 116 that mates with a bevel gear 118. The gearing 116 and bevel gear 118 receive and translate the rotational movement of the input shaft 112 to the ball screw shaft 114.

The ball screw shaft 114 is configured to rotate, in response to receiving the translated movement, to cause movement of the above-mentioned transcowls 102. The ball screw shaft 114 has a first end 122 and a second end 124 and extends through an opening 128 formed in a firewall 130. The first end 122 is coupled to the input shaft 112 and supported by a first bearing assembly 134. Additionally, the first end 122 is connected, via a gimbal mount 132, to the forward end of the engine nacelle support (not illustrated) and is partially disposed within an actuator head support 136. The second end 124 of the ball screw shaft 114 is rotationally supported by a second bearing assembly 136.

The seal assembly 120 is configured to provide a fireproof and leak-tight seal between the ball screw shaft 114 and firewall opening 128. With additional reference to FIG. 4, the seal assembly 120 includes a seal 140, a seal ring 142, and a plurality of retainers 144. The seal 140 is annular and constructed of a suitable, flexible fireproof material, such as, for example, silicon fiberglass. The seal 140 is configured to sealingly mount to the actuator head support 136 via any one of numerous manners. In one exemplary embodiment, such as in FIG. 4, the seal 140 includes first and second flanges 150, 152 that extend radially inward and that are spaced apart to receive the actuator head support 136 therebetween. In another exemplary embodiment, the actuator head support 136 includes a radially outward extending foot 156 that is disposed between the flanges 150, 152.

The seal 140 preferably includes an inner wall 146 and an outer wall 148 that function together and that are appropriately spaced apart to provide a suitable cushion to thereby allow angular movement of the actuator head support 136. The inner and outer walls 146, 148 are preferably coupled to one another to define a space 147 therebetween and may have any one of numerous configurations. For instance, the inner and outer walls 146, 148 may be part of a toroidally-shaped seal or may be substantially parallel with one another to form a square, rectangular, or ovular seal.

Figure 4:
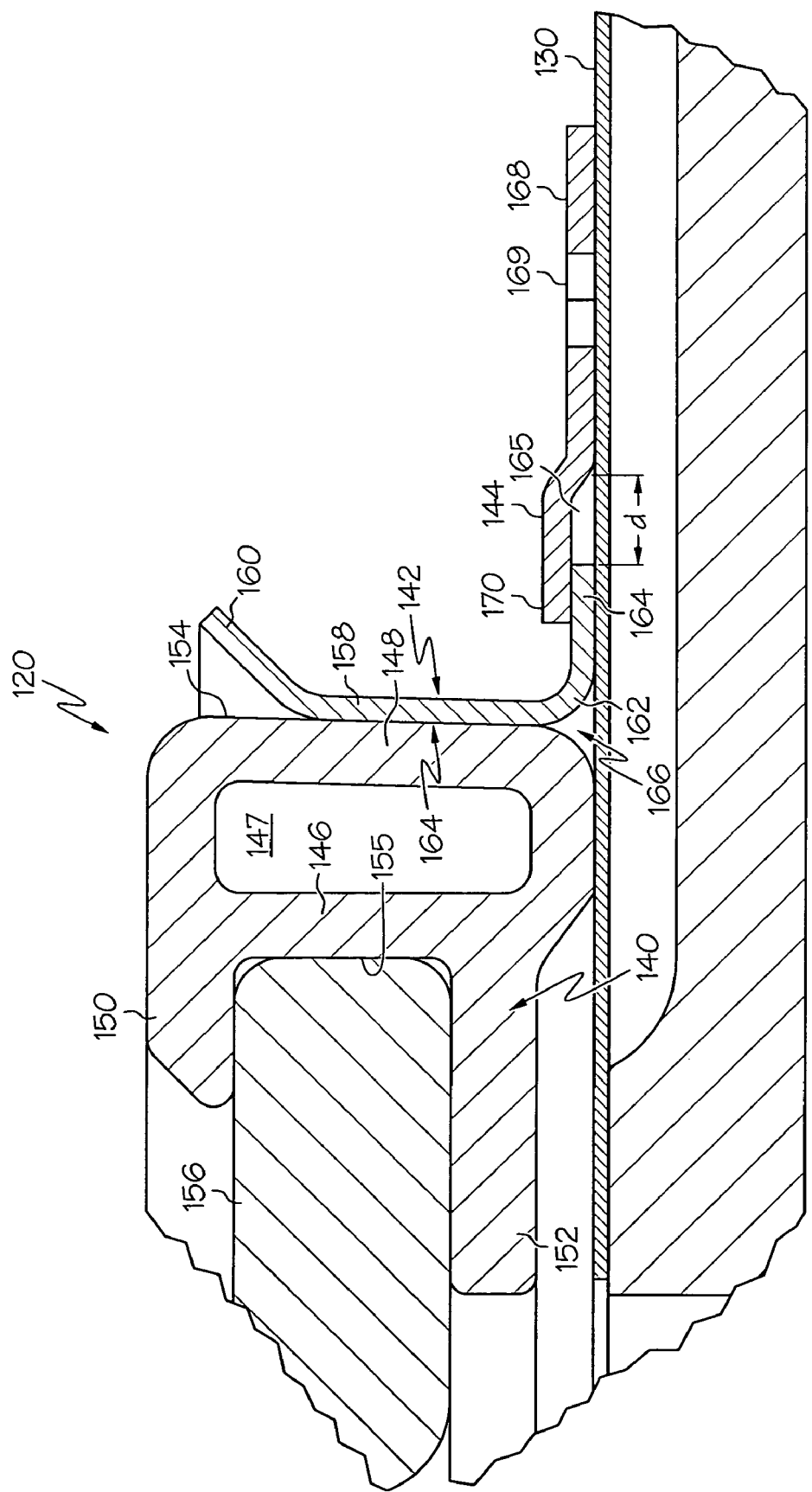
FIG. 4 is s close up of a cross section view of a fire seal assembly that may be mounted on the actuator element depicted in FIG. 3.

With reference to FIGS. 3 and 4, the seal ring 142 is configured to operate with the seal 140 to provide leak-tight engagement across the firewall 130. The seal ring 142 is mounted to the firewall 130 concentric to and in contact with the seal 140. The seal ring 142 includes a substantially ring-shaped sidewall 158 that is slightly shorter in height relative to the seal 140. It will be appreciated that the height of the sidewall 158 may be varied in order to provide additional control of the degree of angular movement that the actuator head support 136, and hence, the actuator 110, may experience. For example, in other exemplary configurations in which smaller angular movements are preferred, the height of the sidewall 158 may be greater than the height of the seal 140.

The seal ring 142 also includes an inlet 160, an outlet 162, and a passage 166 that extends therebetween. The inlet 160 is preferably flared radially outward at an angle to provide still additional control of the angular movement of the actuator 110. Although a flare is shown in FIG. 4, it will be appreciated that other configurations of the inlet 160 are also acceptable. The outlet 162 includes an engagement flange 164 that protrudes radially outward from the seal ring 142 and that provides a surface for contacting and coupling to the firewall 130. The engagement flange 164 may have any configuration, for example, annular and flush against the firewall 130, as shown in FIG. 4. The passage 166 is suitably configured to receive the seal 140 and actuator foot 156 so that when the two are disposed therein, the combination of a force exerted by the sidewall 158 and an opposite force exerted by the seal 140 produces a leak tight engagement.

With reference to FIGS. 4 and 5, the plurality of retainers 144 retains the seal ring 142 against the firewall 130. The retainers 144 may have any one of numerous configurations. In one example, each of the retainers 144 includes a firewall contact section 168 and a ring contact section 170. The firewall contact section 168 is substantially flat and capable of laying flush against the firewall 130 to directly fasten thereto. The firewall contact section 168 couples the retainer 144 to the firewall 130 via any one of numerous manners. For example, the firewall contact section 168 may include a plurality of apertures for receiving a fastener, or the firewall contact section 168 may be temporarily bonded to the firewall 130. The ring contact section 170 is slightly raised relative to the firewall contact section 168 so that a gap 165 is formed between the ring contact section 170 and the firewall 130 when the firewall contact section 168 is coupled to the firewall 130. The engagement flange 164 is disposed in the gap 165, which is employed to provide lateral movement capabilities to the actuator head 136.

It will be appreciated that the degree of lateral movement may also be affected by the distance between the firewall contact section 168 and the seal ring 142. For example, the firewall contact section 168 in FIG. 4 is placed a distance "d" from the end of the seal ring 142. Thus, the seal ring 142 can travel within the gap 165 a distance of "d" to provide lateral movement to the actuator 110. Additionally, each of the retainers 144 may be positioned at predetermined locations around the seal ring 142 and sufficiently spaced apart for the actuator head 136 movement. Moreover, although three retainers 144 are shown, more or fewer retainers may be employed. The retainers 144 may also be similar or different in size and/or shape. For example, as shown in FIG. 5, one of the retainers 144a is sized larger than the other two 144b. The larger retainer 144a is disposed around one half of the seal ring 142 and the other two retainers 144b are coupled to the opposite half of the seal ring 142.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. A seal assembly for sealing an interface between a shaft and a bore formed in a firewall, the shaft having an annular foot extending radially outward therefrom, and a flowpath extending therethrough in fluid communication with the bore, the assembly comprising:
  a flexible annular seal configured to be disposed concentric to the annular foot, the seal having an inner wall coupled to an outer wall to define a space therebetween, the inner wall having a first and a second flange extending radially inward therefrom, the first and second flanges spaced apart for receiving the annular foot therebetween;
  a ring disposed concentric to the annular seal, the ring having a sidewall and an annular engagement flange, the sidewall contacting the annular seal and supplying a force against the seal to provide a leak tight fit between the annular seal and the ring, the annular engagement flange extending radially outward from the sidewall; and
  a plurality of retainers disposed at predetermined locations around the ring, each retainer having a firewall contact section coupled to a ring contact section, the firewall contact section adapted to couple to the firewall and the ring contact section coupled to the annular engagement flange.

2. The seal assembly of claim 1, wherein the flexible annular seal is toroidally-shaped.

3. The seal assembly of claim 1, wherein the inner and outer walls are constructed of a flexible material and are coupled together to allow lateral movement of the shaft.

4. The seal assembly of claim 3, wherein the flexible annular seal comprises fireproof material.

5. The seal assembly of claim 1, wherein the inner wall is constructed of a flexible material and the inner and outer walls are coupled together to allow lateral movement of the shaft.

6. The seal assembly of claim 1, wherein the ring sidewall includes a flare section at one end, the flare section extending radially outward at an angle.

7. The seal assembly of claim 6, wherein the ring sidewall and the seal each has a height and the ring sidewall height is less than the seal height.

8. The seal assembly of claim 1, wherein the plurality of retainers further comprises a first, a second, and a third retainer.

9. The seal assembly of claim 8, wherein the first, second, and third retainers vary in length.

10. The seal assembly of claim 8, wherein the first and second retainers are shorter than the third retainer.

11. The seal assembly of claim 1, wherein the ring contact section and the firewall define a gap therebetween and the engagement flange is disposed within the gap.

12. The seal assembly of claim 11, wherein the plurality of retainers are each positioned to allow lateral movement of the ring within each of the gaps of each of the ring contact sections.

13. An aircraft firewall comprising:
  a housing having a wall defining a cavity and a bore formed in the cavity;
  a shaft having an annular foot extending radially outward therefrom and a flowpath extending therethrough in fluid communication with the bore;
  a flexible annular seal disposed concentric to the annular foot, the seal having an inner wall coupled to an outer wall to define a space therebetween, the inner wall having a first and a second flange extending radially inward therefrom, the first and second flanges spaced apart and receiving the annular foot therebetween;
  a ring disposed concentric to the annular seal, the ring having a sidewall and an annular engagement flange, the sidewall contacting the annular seal and supplying a force against the seal to provide a leak tight fit between the seal and ring, the annular engagement flange extending radially outward from the sidewall; and a plurality of retainers disposed at predetermined locations around the ring, each retainer having a firewall contact section coupled to a ring contact section, the firewall contact section coupled to the housing wall and the ring contact section coupled to the annular engagement flange.

14. The aircraft firewall of claim 13, wherein the flexible annular seal is toroidally-shaped.

15. The aircraft firewall of claim 13, wherein the inner and outer walls are constructed of a flexible material and are coupled together to allow lateral movement of the shaft.

16. The aircraft firewall of claim 15, wherein the flexible annular seal comprises fireproof material.

17. The aircraft firewall of claim 13, wherein the inner wall is constructed of a flexible material and the inner and outer walls are coupled together to allow lateral movement of the shaft.

18. The aircraft firewall of claim 13, wherein the ring sidewall includes a flare section at one end, the flare section extending radially outward at an angle.

19. The aircraft firewall of claim 18, wherein the ring sidewall and the seal each has a height and the ring sidewall height is less than the seal height.

20. The aircraft firewall of claim 13, wherein the plurality of retainers further comprises a first, a second, and a third retainer.

21. The aircraft firewall of claim 20, wherein the first, second, and third retainers vary in length.

22. The aircraft firewall of claim 20, wherein the first and second retainers are shorter than the third retainer.

23. The aircraft firewall of claim 13, wherein the housing wall is a firewall.

24. The aircraft firewall of claim 13, wherein the ring contact section and the firewall define a gap therebetween and the engagement flange is disposed within the gap.

25. The aircraft firewall of claim 24, wherein the plurality of retainers are each positioned to allow lateral movement of the ring within each of the spaces of each of the ring contact sections.

26. A thrust reverser system comprising:
a housing having a bore formed therein;
an actuator head support coupled to the housing, the actuator head support having an annular foot extending radially outward therefrom and a flowpath extending therethrough in fluid communication with the bore; and
a seal assembly coupled to the actuator head support and the housing, the seal assembly comprising:
a flexible annular seal disposed concentric to the annular foot, the seal having an inner wall coupled to an outer wall to define a space therebetween, the inner wall having a first and a second flange extending radially inward therefrom, the first and second flanges spaced apart and receiving the annular foot therebetween;

a ring disposed concentric to the annular seal, the ring having a sidewall and an annular engagement flange, the sidewall contacting the annular seal and supplying a force against the seal to provide a leak tight fit between the seal and ring, the annular engagement flange extending radially outward from the sidewall; and a plurality of retainers disposed at predetermined locations around the ring, each retainer having a firewall contact section coupled to a ring contact section, the firewall contact section coupled to the housing wall and the ring contact section coupled to the annular engagement flange.

27. The thrust reverser system of claim 26, wherein the flexible annular seal is toroidally-shaped.

28. The thrust reverser system of claim 26, wherein the inner and outer walls are constructed of a flexible material and are coupled together to allow lateral movement of the shaft.

29. The thrust reverser system of claim 28, wherein the flexible annular seal comprises fireproof material.

30. The thrust reverser system of claim 26, wherein the inner wall is constructed of a flexible material and the inner and outer walls are coupled together to allow lateral movement of the shaft.

31. The thrust reverser system of claim 26, wherein the ring sidewall includes a flare section at one end, the flare section extending radially outward at an angle.

32. The thrust reverser system of claim 31, wherein the ring sidewall and the seal each has a height and the ring sidewall height is less than the seal height.

33. The thrust reverser system of claim 26, wherein the plurality of retainers further comprises a first, a second, and a third retainer.

34. The thrust reverser system of claim 33, wherein the first, second, and third retainers vary in length.

35. The thrust reverser system of claim 33, wherein the first and second retainers are shorter than the third retainer.

36. The thrust reverser system of claim 26, wherein the housing wall is a firewall.

37. The thrust reverser system of claim 26, wherein the ring contact section and the firewall define a gap therebetween and the engagement flange is disposed within the gap.

38. The thrust reverser system of claim 37, wherein the plurality of retainers are each positioned to allow lateral movement of the ring within each of the spaces of each of the ring contact sections.

* * * * *